M. A. WALKER & C. C. MOORE.
RUBBER SPRING TIRE.
APPLICATION FILED JULY 21, 1916.
1,227,024.
Patented May 22, 1917.
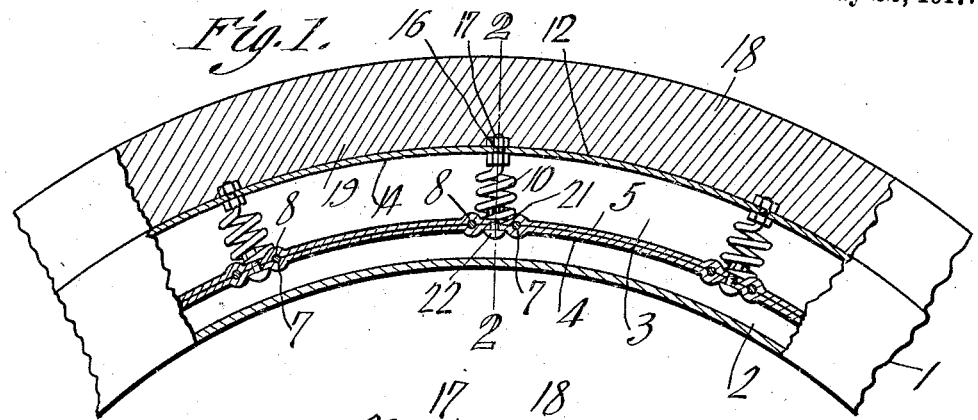
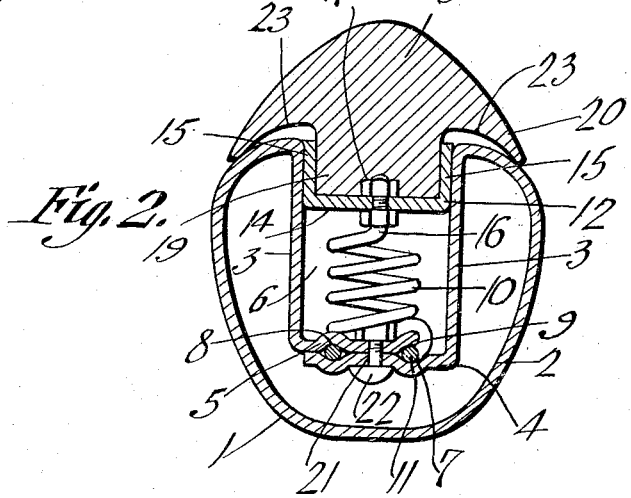
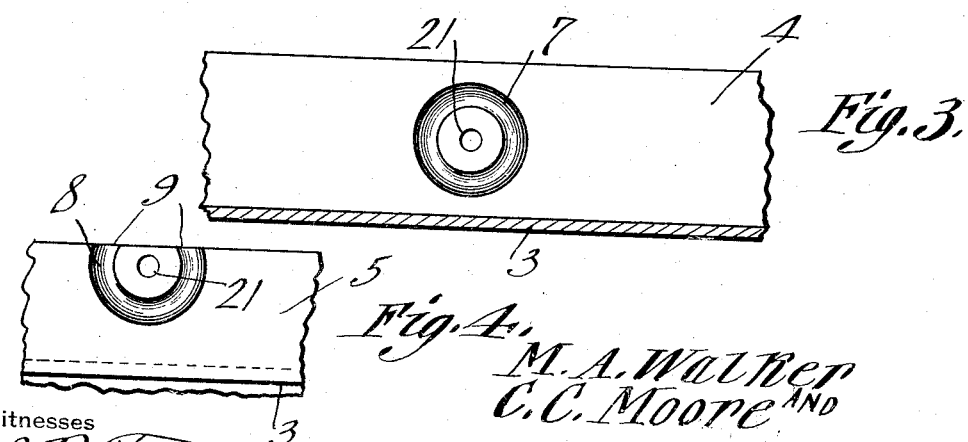
Witnesses
Inventors
M. A. Walker
C. C. Moore
by
Attorneys

UNITED STATES PATENT OFFICE.

MATTHEW A. WALKER AND CHARLES C. MOORE, OF ELEPHANT BUTTE, NEW MEXICO.

RUBBER SPRING-TIRE.

1,227,024.                    Specification of Letters Patent.         Patented May 22, 1917.

Application filed July 21, 1916. Serial No. 110,569.

*To all whom it may concern:*

Be it known that we, MATTHEW A. WALKER and CHARLES C. MOORE, citizens of the United States, residing at Elephant Butte, in the county of Sierra, State of New Mexico, have invented a new and useful Rubber Spring-Tire, of which the following is a specification.

The device forming the subject matter of this application is a spring tire, and one object of the invention is to provide a device of this type in which pneumatic tires and like elements subject to puncture and deterioration may be dispensed with.

Another object of the invention is to provide novel means for connecting the springs which support the tread, with the rim; and a further object of the invention is to provide novel means whereby dirt will be prevented from entering the groove in the rim.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in fractional side elevation, a tire embodying the present invention, parts being in section;

Fig. 2 is a cross section on the line 2—2 of Fig. 1;

Fig. 3 is a fragmental horizontal section showing the upper face of one extension of the rim; and Fig. 4 is a fragmental bottom plan showing a portion of the other extension of the rim.

The device forming the subject matter of this application includes a rim 1 which may be made in any desired manner. In the present instance, but not of necessity, the rim 1 is made of metal and includes a curved body 2 having inwardly projecting flanges 3 provided with overlapped extensions 4 and 5 which project toward the median plane of the rim. In the outer face of the extension 4 there is formed an annular seat 7, and in the inner face of the extension 5 there is formed an annular seat 8 which opens, as shown at 9, through one edge of the extension 5. The sides 4 and 5 are provided with openings 21 located within the contour of the seats 5 and 7, and adapted to receive a fastening device of any kind such as a bolt and nut structure 22. The flanges 3 and their extensions 4 and 5 define a tread groove 6.

The numeral 10 designates helical springs, and of these springs there may be any desired number. The springs 10 are located in the tread groove 6, the inner convolutions 11 of the springs 10 being bound between the extensions 4 and 5 and being engaged in the seats 7 and 8. Since the seat 8 opens as shown at 9 through one edge of the part 5, the spring 10 may pass outwardly from between the extensions 4 and 5. The bolt and nut structure 21, obviously, serves to bind the parts 4 and 5 together on the convolution 11 of the spring 10.

The numeral 12 designates a tire holder which may be trough-shaped in cross section, and of annular form, the tire holder 12 being mounted to move in the groove 6 defined by the parts 3, 4 and 5. The tire holder 12 includes a base 14 and side flanges 15, the side flanges 15 being engaged slidably with the inner faces of the flanges 3. The outer ends 16 of the springs 10 pass through the base 14 of the tire holder 12 and may be secured thereto by means of nuts 17, which, being threaded onto the end 16 of the spring, engage the inner and outer faces of the base 14 of the tire holder 12.

The numeral 18 denotes a tread which preferably is made of rubber or a rubber composition. The tread 18 includes an inner continuous rib 19 seated in the tire holder 12 and preferably secured thereto. The tread is provided with wings 20 overlapped on the outer face of the rim 1 on each side of the groove 6. Adjacent the groove 6, the wings 20 are concaved outwardly, as indicated at 23, so as to afford a little clearance between the wings and the rim, the outer circumferential edges of the wings 20, however, bearing on the rim 1 near its sides.

In practical operation, when the tread 18 is compressed, the springs 10 will yield, and the tire holder 12 together with the tread 18 will move inwardly. The wings 20 serve to prevent the entrance of dirt and foreign material into the tread groove 6.

It is to be observed that the outer nuts 17 are engaged with the tread 18, and consequently, the tread 18 is prevented from creeping circumferentially with respect to the holder 12.

Having thus described the invention, what is claimed is:

In a device of the class described, a rim of curvilinear outline and provided with inwardly projecting flanges forming a tread groove, the flanges being equipped with extensions which project toward each other, in overlapped relation; a spring, one end of which is bound between the extensions; means for connecting the extensions; a tread mounted to reciprocate in the tread groove; and means for securing the outer ends of the springs to the tread.

In testimony that we claim the foregoing as our own, we have hereto affixed our signatures in the presence of two witnesses.

MATTHEW A. WALKER.
CHARLES C. MOORE.

Witnesses:
CHAS. ALLEN,
HOWARD D. JOHN.

Copies of this patent may be obtained for five cents each, by addressing the "Commissioner of Patents, Washington, D. C."